US010511026B2

(12) United States Patent
Fukasawa et al.

(10) Patent No.: US 10,511,026 B2
(45) Date of Patent: Dec. 17, 2019

(54) ELECTRODE FOR NONAQUEOUS ELECTROLYTE SECONDARY BATTERY, NONAQUEOUS ELECTROLYTE SECONDARY BATTERY, BATTERY PACK, AND VEHICLE

(71) Applicant: Kabushiki Kaisha Toshiba, Minato-ku (JP)

(72) Inventors: Takayuki Fukasawa, Yokohama (JP); Kenji Essaki, Kawasaki (JP); Tomokazu Morita, Funabashi (JP); Takashi Kuboki, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 247 days.

(21) Appl. No.: 15/255,720

(22) Filed: Sep. 2, 2016

(65) Prior Publication Data

US 2016/0372753 A1 Dec. 22, 2016

Related U.S. Application Data

(63) Continuation of application No. PCT/JP2014/057971, filed on Mar. 24, 2014.

(51) Int. Cl.
*H01M 4/62* (2006.01)
*H01M 4/134* (2010.01)
(Continued)

(52) U.S. Cl.
CPC ........... *H01M 4/624* (2013.01); *H01M 4/134* (2013.01); *H01M 4/362* (2013.01); *H01M 4/386* (2013.01);
(Continued)

(58) Field of Classification Search
CPC ...... H01M 4/624; H01M 4/134; H01M 4/362; H01M 4/386; H01M 4/483; H01M 4/587;
(Continued)

(56) References Cited

U.S. PATENT DOCUMENTS

2005/0233213 A1 10/2005 Lee et al.
2007/0122701 A1 5/2007 Yamaguchi
(Continued)

FOREIGN PATENT DOCUMENTS

JP 2004-335334 11/2004
JP 2005-259697 9/2005
(Continued)

OTHER PUBLICATIONS

English Translation of International Search Report dated Jun. 17, 2014 in PCT/JP2014/057971, filed Mar. 24, 2014.

*Primary Examiner* — Laura Weiner
(74) *Attorney, Agent, or Firm* — Oblon, McClelland, Maier & Neustadt, L.L.P.

(57) ABSTRACT

A negative electrode active material of an embodiment for a nonaqueous electrolyte battery includes silicon or silicon oxide including silicon inside, a carbonaceous substance containing the silicon or the silicon oxide including silicon inside, and a phase including a silicate compound and a conductive assistant, the phase being interposed between the silicon or the silicon oxide including silicon inside and the carbonaceous substance. The silicate compound is a complexed oxide including an oxide including at least one element selected from the group consisting of; an alkaline earth element, a transition metal element, and a rare-earth element and a silicon oxide.

10 Claims, 6 Drawing Sheets

(51) Int. Cl.
    *H01M 4/36*     (2006.01)
    *H01M 4/38*     (2006.01)
    *H01M 4/48*     (2010.01)
    *H01M 4/587*     (2010.01)
    *H01M 10/0525*     (2010.01)
    *H01M 10/052*     (2010.01)
    *H01M 4/02*     (2006.01)

(52) U.S. Cl.
    CPC ........... *H01M 4/483* (2013.01); *H01M 4/587* (2013.01); *H01M 10/0525* (2013.01); *H01M 10/052* (2013.01); *H01M 2004/027* (2013.01); *H01M 2220/20* (2013.01); *H01M 2300/0037* (2013.01); *Y02E 60/122* (2013.01)

(58) Field of Classification Search
    CPC ........... H01M 10/0525; H01M 10/052; H01M 2004/027; H01M 2220/20; H01M 2300/0037; Y02E 60/122
    See application file for complete search history.

(56) References Cited

U.S. PATENT DOCUMENTS

| | | |
|---|---|---|
| 2009/0104515 A1 | 4/2009 | Fujikawa et al. |
| 2011/0097627 A1 | 4/2011 | Watanabe et al. |
| 2014/0110639 A1 | 4/2014 | Yamamura |

FOREIGN PATENT DOCUMENTS

| | | |
|---|---|---|
| JP | 2007-59213 | 3/2007 |
| JP | 2007-141666 | 6/2007 |
| JP | 2009-104892 | 5/2009 |
| JP | 2010-170943 | 8/2010 |
| JP | 2011-96455 | 5/2011 |
| JP | 2012-014939 A | 1/2012 |
| JP | 2012-33317 | 2/2012 |
| JP | 4967839 | 7/2012 |
| JP | 2012-151129 | 8/2012 |
| JP | 2013-8567 | 1/2013 |
| JP | 2014-2890 | 1/2014 |

ELECTRODE FOR NONAQUEOUS ELECTROLYTE SECONDARY BATTERY, NONAQUEOUS ELECTROLYTE SECONDARY BATTERY, BATTERY PACK, AND VEHICLE

CROSS-REFERENCE TO RELATED APPLICATION

This application is a continuation application based upon and claims the benefit of priority from International Application PCT/JP2014/057971, the International Filing Date of which is Mar. 24, 2014 the entire contents of which are incorporated herein by reference.

FIELD

Embodiments described herein relate to an electrode for nonaqueous electrolyte secondary battery, nonaqueous electrolyte secondary battery, battery pack, and vehicle.

BACKGROUND

Recently, small-sized mobile terminals represented by, for example, smartphones and tablets, have rapidly become widespread. Therefore, a demand for small-sized and high energy density batteries that drive the small-sized mobile terminals, has increased.

Typically, a graphite-based material is used for a negative electrode of a lithium ion battery. Theoretical capacity of the graphite-based material is 372 mAh/g ($LiC_6$). Currently, the theoretical capacity has nearly approached its limit. Development of a new electrode material is required in order to further improve energy density. In particular, as examples of a negative electrode material, materials to be alloyed with lithium, such as silicon and tin, with low potential and a small electrochemical equivalent, following carbon and lithium, have attracted attention.

In particular, lithium can be inserted into silicon by a ratio of 4.4 atoms of lithium to one atom of silicon. Theoretically, silicon can have capacity approximately 10 times that of a graphite-based carbon material. However, when lithium is inserted into a silicon particle, the volume of the silicon particle expands approximately three to four times. Thus, there is a problem that the particle itself cracks due to repeats of charge and discharge so as to pulverize, or so as to influence other members included in an electrode.

Micronization of the size of a silicon particle is effective in inhibiting the pulverization. However, when the size of the particle decreases, aggregation also easily occurs. Therefore, a countermeasure, such as covering of a silicon particle with silicon oxide or a carbonaceous substance, has been made. However, currently, capacity degradation has not been sufficiently inhibited.

DETAILED DESCRIPTION

A negative electrode active material of an embodiment for a nonaqueous electrolyte battery includes silicon or silicon oxide including silicon inside, a carbonaceous substance containing the silicon or the silicon oxide including silicon inside, and a phase including a silicate compound and a conductive assistant, the phase being interposed between the silicon or the silicon oxide including silicon inside and the carbonaceous substance. The silicate compound is a complexed oxide including an oxide including at least one element selected from the group consisting of; an alkaline earth element, a transition metal element, and a rare-earth element and a silicon oxide.

Examples of a typical problem of an active material including silicon oxide include a problem of initial charge and discharge efficiency. When disproportionation treatment is performed or lithium is inserted due to charge, the silicon oxide separates into a silicon phase and a silicon dioxide phase. The silicon oxide phase including silicon dioxide reacts on the lithium and forms a lithium silicate phase. Then, the silicon oxide phase becomes the so-called irreversible capacity that is not released upon discharge. This problem particularly becomes severe in a case where a battery is made in combination with a positive electrode material. That is, lithium in an amount of the irreversible capacity of the negative electrode is required to be provided on the side of the positive electrode in advance. As a result, energy density degrades. Therefore, it is at least required, for example, to decrease the silicon oxide phase and reduce the irreversible capacity, in order to improve the energy density.

There has been a known method of forming a layer including a silicate compound included in a surface or the inside of an inorganic matter particle capable of insertions and extractions of lithium. Part of silicon oxide included in the active material is made to react on an oxide so that the silicate compound is made. Accordingly, the part of silicon oxide is reduced and then an initial charge and discharge efficiency improves. A conductive path in an electrode is made with a bond between a conductive assistant particle and the active material including the silicate phase. However, the silicate phase typically has low electric conductivity. Thus, formation of the conductive path in the electrode is not sufficient. An inhibition effect with respect to volume expansion of the silicon oxide included in the active material is also not sufficient.

Embodiments will be described below with reference to the drawings.

First Embodiment

Figure 1:
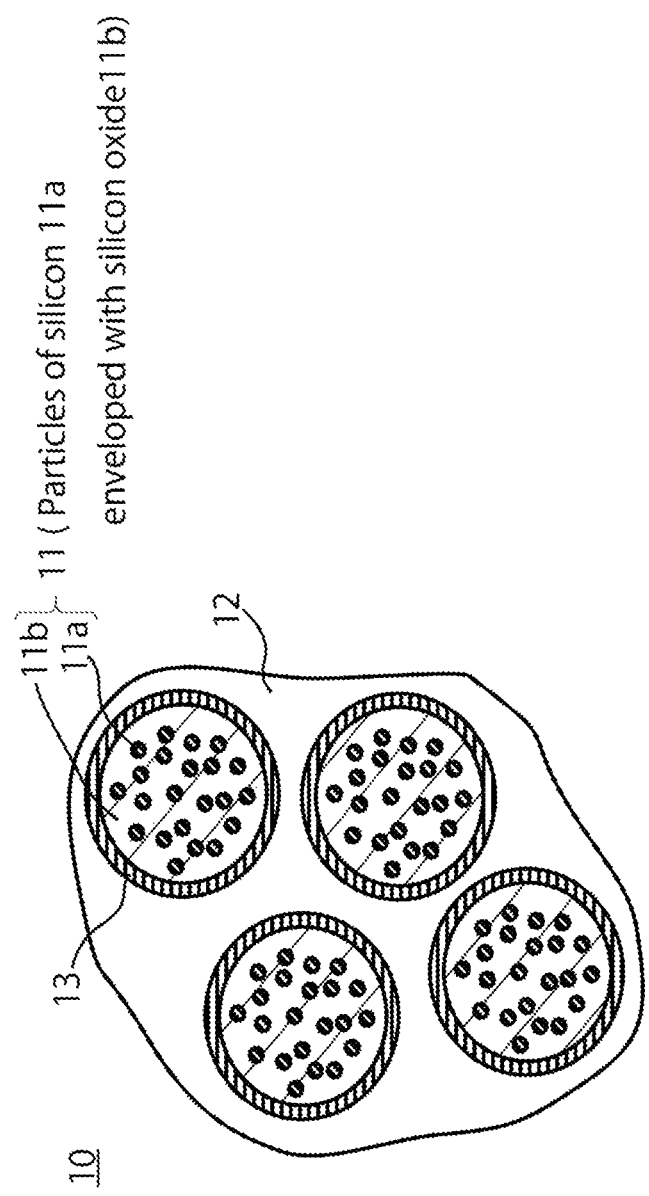
FIG. 1 is a schematic view of a sectional structure of a negative electrode active material according to a first embodiment.

FIG. 1 is a schematic view of a basic sectional structure of a negative electrode active material according to an embodiment. The active material 10 according to the embodiment has a complexed structure including a material 11 having silicon capable of insertions and extractions of lithium, covered with a carbonaceous substance 12.

The active material 10 has a silicon oxide particle 11 including silicon inside and a phase 13. The silicon oxide particle 11 includes a silicon particle 11a included in silicon oxide 11b. The phase 13 including the silicate compound and the conductive assistant mixed, covers at least a part of the silicon oxide particle 11 including silicon inside. The active material 10 has a structure including the individual particle or the plurality of particles further covered with the carbonaceous substance 12. The phase 13 including the silicate compound and the conductive assistant mixed, is interposed between the silicon oxide particle 11 including silicon inside and the carbonaceous substance 12.

The average primary grain diameter of the active material 10 is preferably in a range of 0.1 µm or more to 50 µm or less. In a case where the average primary grain diameter is smaller than 0.1 µm, a specific surface increases. Thus, when an electrode is made, additional binder in that amount is required. In a case where the average primary grain diameter is larger than 50 µm, an unintended space is easily formed when the electrode is made. As a result, degradation of capacity per volume occurs. A rough particle becomes an obstacle in a coating process. The average primary grain diameter is more preferably 0.2 µm or more to 20 µm or less. For example, once the complexed particle is pulverized and classified, the active material 10 having the size can be obtained. The size of the silicon particle 11a included in the silicon oxide 11b is preferably made to be 2 nm or more to 150 nm or less. It is difficult to manufacture a size less than 2 nm. A size larger than 150 nm easily causes pulverization due to repeats of charge and discharge. Note that, when the active material 10 is observed by scanning electron microscopy (SEM) or transmission electron microscopy (TEM) with a magnifying power of 20000 or more, at least 20 particles present on a diagonal line in a visual field are selected and then the average diameter thereof can be obtained as the average primary grain diameter of the active material 10. A particle diameter is defined as an average of the major axis and the minor axis of a particle in a two-dimensional image.

The silicon particle 11a may be crystalline, amorphous, or a mixture thereof. The silicon particle 11a may include a trace element, such as phosphorus or boron, inside. The silicon particle 11a causes a variation of volume every time lithium is inserted and extracted. There is a risk that disintegration of the active material 10 occurs. Therefore, a minute size is preferable. The average diameter of the silicon particle 11a can be measured by a method the same as that of the average primary grain diameter of the active material 10.

A structure including the silicon particle 11a enveloped by the silicon oxide 11b, namely, a form including the silicon particle 11a contained in the silicon oxide 11b, is at least made. With adoption of the present form, the silicon oxide 11b can prevent the silicon particle 11a from being detached or fallen even when the silicon particle 11a repeats volume expansion.

The particle 11 including the silicon particle 11a included in the silicon oxide 11b, can be manufactured by, for example, performing the disproportionation treatment to a silicon oxide particle, such as silicon monooxide. The manufacturing method is not limited to this. For example, the particle 11 may be manufactured by mixing the silicon particle 11a and the silicon oxide particle with mechanochemical treatment. As a method for synthesization with better homogeneity and better simplicity, a disproportionation method with heat treatment is more preferable.

The average primary grain diameter of the silicon oxide particle 11 including silicon inside, is preferably in a range of 0.1 µm or more to 10 µm or less. When the average primary grain diameter is made in this range in consideration of cycle characteristics, no large degradation occurs. Thus, stable charge and discharge characteristics are achieved.

The mixed phase 13 that is a covering layer for the silicon oxide 11b including the silicon particle 11a inside preferably has reaction inertness with respect to lithium and does not cause volume expansion during charge and discharge, the mixed phase 13 including the silicate compound and the conductive assistant.

The silicate compound is a complexed oxide of an oxide and a silicon oxide, the oxide including at least one element selected from the group consisting of; an alkaline earth element, a transition metal element, and a rare-earth element.

Examples of the silicate compound include $MgSiO_3$, $Mg_2SiO_4$, $TiSiO_4$, $Mn_2SiO_4$, $FeSiO_3$, $Fe_2SiO_4$, $CO_2SiO_4$, $Ni_2SiO_4$, $Al_2SiO_5$, $ZrSiO_4$, $Y_2SiO_5$, and $Y_2Si_2O_7$. Part of the silicon oxide 11b is used for formation of the silicon compound. Thus, irreversible capacity can be reduced and initial charge and discharge efficiency can increase.

Typically, the silicate compound has insulation performance. Thus, the silicate compound mixed with the conductive assistant is preferably used as the mixed phase 13. Examples of the conductive assistant preferably include a carbonaceous substance, silicon carbide, and a mixture thereof. Examples of the carbonaceous substance include graphite, hard carbon, soft carbon, amorphous carbon, and acetylene black. A mixing ratio between the silicate compound and the conductive assistant (silicate compound: conductive assistant) is typically between 10:90 (mass) and 90:10 (mass).

The conductive assistant may be particulate or fibrous. Alternatively, the conductive assistant may include an amorphous phase having no particle shape. The mixed phase 13 may be a homogeneous composite phase. Alternatively, the mixed phase 13 may have gradient composition in which the rate of an amount of the conductive assistant gradually increases from a surface portion of the silicon oxide particle 11 including the silicon particle 11a inside toward the carbonaceous substance covering layer 12. The mixed phase 13 includes the silicate compound and the conductive assistant. Thus, the active material 10 can secure a conductive path to the silicon particle 11a, and can perform excellent battery characteristics.

The silicate compound and the conductive assistant can be ascertained by observation with TEM and composition analysis with TEM-EDX. Point analysis is performed to at least three points at a boundary layer between the silicon particle 11a or the silicon oxide particle 11 including silicon inside and the carbonaceous substance 12 therearound. An element component included in each of the three points is examined. Thus, it can be ascertained that the silicate compound is present. Simultaneously, existence of the carbonaceous substance 12 included in the compound phase can be also examined.

The carbonaceous substance 12 preferably includes an amorphous phase. The amorphous phase may include a carbon material having high crystallinity, such as graphite, a carbon nanofiber, or a carbon nanotube, or a minute particle, such as acetylene black. A minute pore of approximately 10 nm or more to 10 µm or less may be contained.

Examples of the carbonaceous substance 12 containing the silicon oxide 11b having silicon inside, at least one material selected from the group consisting of; graphite, hard carbon, soft carbon, amorphous carbon, and acetylene black, preferably, include only hard carbon, and a mixture of graphite and hard carbon. Graphite is preferable in that graphite increases conductivity of the active material 10 and improves capacity. Hard carbon has a large effect of covering the entire active material 10 and relaxing expansion and contraction.

When the mass of the active material 10 is defined as 100 mass %, the silicon or the silicon oxide 11b having silicon inside preferably accounts for 20 mass % or more to 75 mass % or less. When the rate is smaller than 20 mass %, an effect of using silicon as a high-capacity material is small. When the rate is larger than 75 mass %, it is difficult to secure the conductivity and also the cycle characteristics considerably degrade.

The rate of the silicon or the silicon oxide 11b including silicon inside, in the active material 10 can be examined when a section including an electrode is extracted, by performing the following analysis for a complex present in the section. An observation with a magnifying power of 20000 or more is performed. The rate of the area of the complex and the area of the silicon or/and the silicon oxide particle 11 present therein is obtained. Next, the rate of the silicon or the silicon oxide 11b including silicon inside, present in the complex (carbonaceous substance) to the complex is estimated with a density of 2.3 g/cm$^3$ for the silicon particle 11a, a density of 2.2 g/cm$^3$ for the silicon oxide 11b (silicon dioxide), and a density of 1.8 g/cm$^3$ for hard carbon representative as the carbonaceous substance 12.

Figure 2:
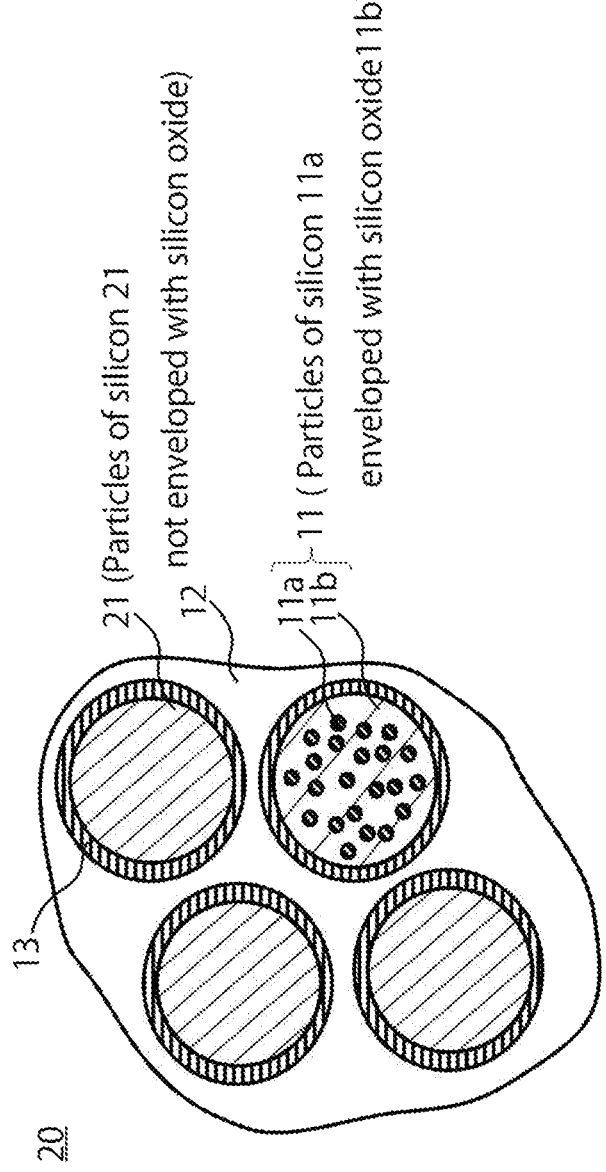
FIG. 2 is a schematic view of a sectional structure of another negative electrode active material according to the first embodiment.

The silicon oxide particle 11 including the silicon particle 11a inside may have a structure including a silicon particle 21 including no silicon oxide particle 11, replaced as illustrated in FIG. 2. In this case, the active material 20 includes the silicon particle 21, a carbonaceous substance 12 containing the silicon particle 21, a phase including a silicate compound and a conductive assistant 13 interposed between silicon 11a and the carbonaceous substance 12. The active material 20 including the silicon particle 21 may include the single body or, as illustrated in FIG. 2, may include a combination of the silicon oxide particle 11 including the silicon particle 11a, and the silicon particle 21.

(Manufacturing Method)

Next, a method of manufacturing the negative electrode active material 10 for a nonaqueous electrolyte secondary battery according to the first embodiment will be described.

First, a complexed form including the covering of the silicon oxide particle 11 having the silicon particle 11a inside, with the mixed phase 13 including the silicate compound and the conductive assistant, and the covering thereof with the carbonaceous substance 12, illustrated in FIG. 1 is a final form. In a method of separating the silicon with disproportionation reaction, timing of the disproportionation may be made upon covering and complexing with carbon to be described later. In a case where the mixed phase including the silicate compound and the conductive assistant, is formed to the silicon particle instead of the silicon oxide particle including the silicon particle inside, the silicon particle is used instead of the silicon oxide particle including the silicon particle inside. The use of the silicon oxide particle including the silicon particle inside, will be given, as a premise, in the following descriptions. In a case where the silicon particle is used, the active material can be also manufactured by the same method. Thus, the duplicate descriptions of the manufacturing method will be omitted First, as a precursor of the silicate compound, the covering layer including a minute-sized particle or an oxide precursor is formed around the silicon oxide particle including the silicon particle being a raw material inside. Examples of an element included in the oxide to be used for the covering, include at least one element selected from the group consisting of; an alkaline earth element, a transition metal element, and a rare-earth element. For example, the average primary grain diameter of the minute-sized oxide particle is preferably 5 nm or more to 50 nm or less. For example, the average primary grain diameter of the oxide precursor is preferably 2 nm or more to 30 nm or less.

A metal salt solution method and a sol-gel method can be used for the covering with the precursor of the silicate compound. The method is not limited to these methods. Note that, a method capable of forming a finer particle is preferable in order to cause the oxide to be formed around the silicon oxide particle to have reactivity as sensitive as possible. A method capable of forming a thin covering film is preferable in order to avoid influence, such as degradation of capacity, to the charge and discharge characteristics due to formation with a thick thickness.

When the precursor of the silicate compound is formed around the silicon oxide particle including the silicon particle inside, the precursor may be formed so as to mix with a particle to be the conductive assistant or a carbon precursor. After the precursor of the silicate compound is formed around the silicon oxide particle including the silicon particle inside, the particle to be the conductive assistant or the carbon precursor may be formed around or may cover the silicon oxide particle including the silicon particle inside, covered with the silicate compound precursor.

Mixing and stirring treatment to the precursor of the silicate compound and the silicon oxide particle including the silicon particle inside, or the precursor of the silicate compound and the particle to be the conductive assistant, or the carbon precursor and the silicon oxide particle including the silicon particle inside, can be performed with various types of stirrers, a ball mill apparatus, a bead mill apparatus, or a combination thereof. Liquid-phase mixing is preferably performed to the mixing of the silicon oxide particle including the silicon particle inside and the oxide precursor, in a liquid with a dispersion medium. Examples of the dispersion medium that can be used include an organic solvent and water. For example, a spray drying method may be used.

Next, an object to be treated that has been subjected to the mixing and stirring treatment, is subjected to dehydration and heat treatment. Accordingly, the oxide precursor is oxidized. Then, the formed oxide and the silicon oxide react each other so that the silicate compound is synthesized. Alternatively, the object to be treated that has been subjected to the mixing and stirring treatment, is subjected to the dehydration and the heat treatment. Then, the oxide and the silicon oxide react each other so that the silicate compound is synthesized. The temperature of the heat treatment depends on the oxide to be formed and the silicate compound. The heat treatment is preferably performed at a temperature appropriate and suitable to each of the oxide and the silicate compound. The mixed phase including the silicate compound and the conductive assistant, may cover apart of the particle, the entire particle, or the plurality of particles collectively. The mixed phase bonds in contact with the silicon oxide particle including the silicon particle inside. An unreacted oxide (silicate compound precursor) may partially remain. Note that, when an amount of the unreacted oxide is more than necessary, inhibition to the conductivity is caused. Thus, an amount to be consumed by reaction with the silicon oxide is preferable as much as possible. In a case where the covering is performed simultaneously with the carbon precursor, the covering phase including the mixture of the silicate compound and the conductive assistant can be formed around the silicon oxide particle including the silicon particle inside, at this point.

The temperature of the heat treatment is not particularly limited, and is preferably 900° C. or less. When the temperature is made to be more than 900° C., disproportionation reaction of the silicon oxide simultaneously occurs. In consideration of another heat treatment process during complexing treatment with later carbon covering, it is unfavorable that the silicon particle that has been separated once has grain growth more than necessary. Thus, the heat treatment is preferably performed at a temperature lower than the disproportionation temperature at this stage. In a case where the silicon particle is used instead of the silicon oxide particle including the silicon particle inside, the heat treatment temperature may be in a temperature condition the same as that of the silicon oxide particle including the silicon particle inside.

Next, the silicon oxide particle including the silicon particle inside, covered with the mixed phase including the silicate compound and the conductive assistant, is contained and complexed in the carbonaceous substance. The covering with the carbonaceous substance may be made to a single silicon oxide particle including the silicon particle inside. Alternatively, the covering with the carbonaceous substance may be made so as to simultaneously contain a plurality of silicon oxide particles including the silicon particle inside. In this case, a part of the silicon oxide particle including the silicon particle inside, may be exposed from a surface of a carbonaceous substance phase. Other than the silicon oxide particle including the silicon particle inside, covered with the mixed phase including the silicate compound and the conductive assistant, the silicon particle covered with the mixed phase including the silicate compound and the conductive assistant may be included in the complex with the carbonaceous substance. Instead of the silicon oxide particle including the silicon particle inside, covered with the mixed phase including the silicate compound and the conductive assistant, the complex may include the silicon particle covered with the mixed phase including the silicate compound and the conductive assistant, and the carbonaceous substance. In this manner, the material capable of insertions and extractions of lithium is dispersed in the structure. Thus, the carbonaceous substance phase acts as a buffer phase that relaxes stress due to the volume expansion. As a result, the active material can be prevented from pulverizing and falling. The carbonaceous phase is also a favorable conductive material. Thus, the carbonaceous phase considerably contributes to improvement of charge and discharge capacity and charge and discharge efficiency.

(Complexing Treatment)

Next, a method of covering and complexing the silicon particle or the silicon oxide particle including the silicon particle inside, covered with the mixed phase including the silicate compound and the conductive assistant, with the carbonaceous substance, will be described. In a case where the disproportionation reaction simultaneously occurs during the above heat treatment process for forming the silicate compound, the silicon oxide particle already becomes the silicon oxide particle including the silicon particle inside at this point.

During the complexing treatment, the silicon particle covered with the mixed phase or the silicon oxide particle covered with the mixed phase and an organic material including the carbon precursor are mixed, complexed, and subjected to carbonizing treatment. This complexed particle may include the carbonaceous substance itself inside.

Examples of the organic material that can be used include at least one type from carbon materials, such as graphite, coke, low-temperature baked carbon, and pitch, and the precursors thereof. In particular, because pitch and the like that melt due to heating melt during mechanical milling treatment, the complexing is not favorably performed. Thus, pitch is preferably mixed and used with a material that does not melt, such as coke or graphite. A carbonaceous substance, such as graphite, hard carbon, soft carbon, amorphous carbon, or acetylene black, may be further added to the organic material.

A method of performing the complexing by mixing and stirring in a liquid phase, will be described below. The mixing and stirring treatment can be performed by various types of stirrers, a ball mill apparatus, a bead mill apparatus, or a combination thereof. The complexing of the silicon particle or the silicon oxide particle including the silicon particle inside, covered with the mixed phase including the silicate compound and the conductive assistant, the carbon precursor, and the carbon material, is preferably performed by liquid-phase mixing in a liquid including a dispersion medium. This is because the dispersion is made so as to be further homogeneous. Examples of the dispersion medium that can be used include an organic solvent and water. A liquid mutually having favorable affinity with the silicate compound, the silicon particle, the silicon oxide particle including the silicon particle inside, and the organic material, is preferably used. The specific examples include ethanol, acetone, isopropyl alcohol, methyl ethyl ketone, ethyl acetate, and N-methylpyrrolidone (NMP).

The carbon precursor is preferably liquid or is soluble in the dispersion medium at a mixing stage so as to be homogeneously mixed with the silicon particle or the silicon oxide particle including the silicon particle inside, covered with the mixed phase including the silicate compound and the conductive assistant. The carbon precursor is more preferably a monomer or an oligomer that is a liquid and can be easily polymerized. For example, organic materials, such as furan resin, xylene resin, ketone resin, amino resin, melamine resin, urea resin, aniline resin, urethane resin, polyimide resin, polyester resin, phenolic resin, resol resin, polyvinyl alcohol, and sucrose, are included. The material mixed in the liquid phase is finally calcined through a solidification or dehydration process so that a complexed material is formed.

(Carbonizing Calcination Treatment)

Carbonizing calcination is performed under an inert atmosphere, such as Ar. The atmosphere is not limited to this and may be a mixed atmosphere, such as Ar including hydrogen. The complexed silicon particle or silicon oxide particle, covered with the silicate compound, with the organic material, is subjected to heat treatment so as to be carbonized. The temperature of the carbonizing calcination is preferably 900° C. or more to 1200° C. or less, depending on the pyrolytic temperature of an organic material compound to be used. For the silicon oxide particle, the carbonizing calcination and disproportionation reaction may be simultaneously made at this stage.

In a case where the temperature of the carbonizing calcination is 1050° C. or more to 1200° C. or less, a reaction that forms a silicon carbide phase at a region at which the silicon particle and the carbonaceous substance directly in contact with each other, may occur. Silicon carbide has electric conductivity, and is preferably present in moderation. However, silicon carbide is made more than necessary at a temperature of more than 1200° C. There is a possibility that the charge and discharge capacity considerably degrades. Thus, a temperature of more than 1200° C. is not preferable. The temperature of the calcination is preferably made to be 1200° C. or less. The time of the calcination is preferably in a range of from 10 minutes to 12 hours.

The negative electrode active material according to the present embodiment is obtained by the above synthesizing method. For example, the grain diameter and the specific surface of a product after the carbonizing calcination may be prepared by using various types of mills, such as a pulverizer and a grinder.

The negative electrode active material according to the first embodiment described above, has at least a diffraction peak at $2\theta=28.4°$ in powder X-ray diffraction measurement. The peak at $2\theta=28.4°$ results from the silicon. The above negative material is used so that the initial charge and discharge efficiency and a cycle lifetime can improve. Thus, the nonaqueous electrolyte secondary battery having excellent energy density and a long lifetime can be achieved.

Second Embodiment

Figure 3:
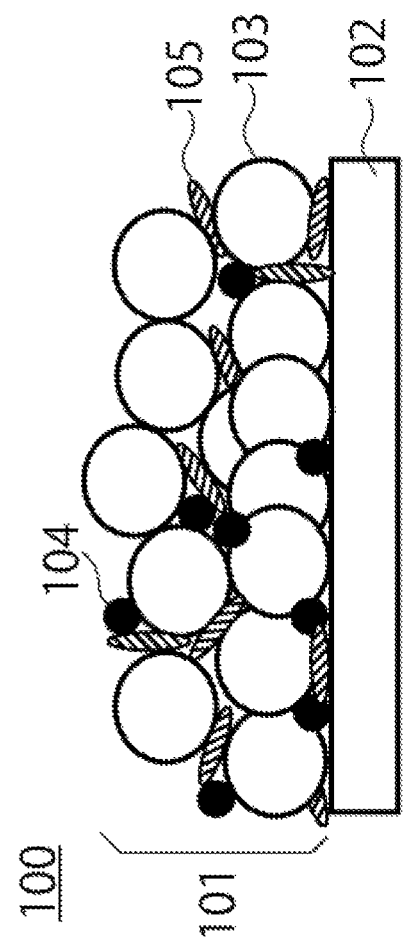
FIG. 3 is a sectional view of an electrode for a nonaqueous electrolyte battery according to a second embodiment.

As illustrated in a sectional view of FIG. 3, a negative electrode mixture layer 101 and a collector 102 are included according to a second embodiment. The negative electrode mixture layer 101 is a mixture layer disposed on the collector 102 and including an active material. The negative electrode mixture layer 101 includes the negative electrode active material 103, a conductive material 104, and a binder 105. The binder 105 causes the negative electrode mixture layer 101 and the collector 102 to adhere to each other. The negative electrode mixture layer 101 is formed on one side or both sides of the collector 102.

The thickness of the negative electrode mixture layer 101 is preferably in a range of 10 µm or more to 150 µm or less. Therefore, the total thickness of the negative electrode mixture layer 101 is in a range of 20 µm or more to 300 µm or less in a case where the negative electrode mixture layer 101 is provided on both sides of the negative electrode collector. A more preferable range of the thickness of the negative electrode mixture layer 101 on the one side, is 10 µm or more to 100 µm or less. Large-current discharge characteristics and a cycle lifetime sharply improve in this range.

The compounding ratios of the negative electrode active material 103, the conductive material 104, and the binder 105 in the negative electrode mixture layer 101, are preferably 57 mass % or more to 95 mass % or less, 3 mass % or more to 20 mass % or less, and 2 mass % or more to 40 mass % or less, respectively, in order to obtain the favorable large-current discharge characteristics and cycle lifetime.

The collector 102 according to the embodiment is a conductive member that binds with the negative electrode mixture layer 101. A conductive substrate having a porous structure or a nonporous and conductive substrate can be used for the collector 102. These conductive substrates can be formed of, for example, copper, stainless steel, or nickel. The thickness of the collector 102 is preferably 5 µm or more to 20 µm or less. A balance between electrode strength and weight reduction can be made in this range.

The active material 10 or the active material 20 according to the first embodiment is preferably used for the negative electrode active material 103.

The negative electrode mixture layer 101 may include the conductive material 104. Examples of the conductive material 104 include acetylene black, carbon black, and graphite.

The negative electrode mixture layer 101 may include the binder 105 that binds negative materials. Examples of the binder 105 that can be used include polytetrafluoroethylene (PTFE), polyvinylidene fluoride (PVdF), ethylene-propylene-diene copolymer (EPDM), styrene-butadiene rubber (SBR), polyimide, and polyaramide. Two types or a combination of more than two types may be used for the binder 105. When a combination of a binder having excellent binding between the active materials and a binder having excellent binding between the active material and the collector 102, or a combination of a material having high hardness and a material having excellent flexibility is used, a negative electrode having excellent lifetime characteristics can be manufactured.

Third Embodiment

A nonaqueous electrolyte secondary battery according to a third embodiment will be described.

The nonaqueous electrolyte secondary battery according to the third embodiment includes an exterior material, a positive electrode, a negative electrode, and a nonaqueous electrolyte. The positive electrode is housed in the exterior material. The negative electrode is spatially apart from the positive electrode, and is housed with, for example, a separator interposed between the positive electrode and the negative electrode in the exterior material. The nonaqueous electrolyte is filled in the exterior material.

Figure 4:
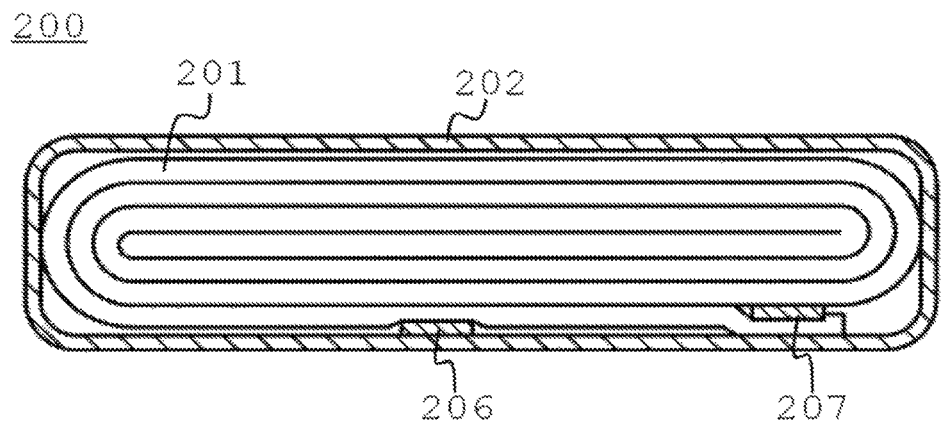
FIG. 4 is a sectional view of a flat nonaqueous electrolyte battery according to a third embodiment.

The more detailed descriptions will be given with reference to a schematic view of the exemplary nonaqueous electrolyte secondary battery 200 according to the embodiment in FIG. 4. FIG. 4 is a schematic sectional view of the flat nonaqueous electrolyte secondary battery 200 having the exterior material 202 including a laminated film.

Figure 5:
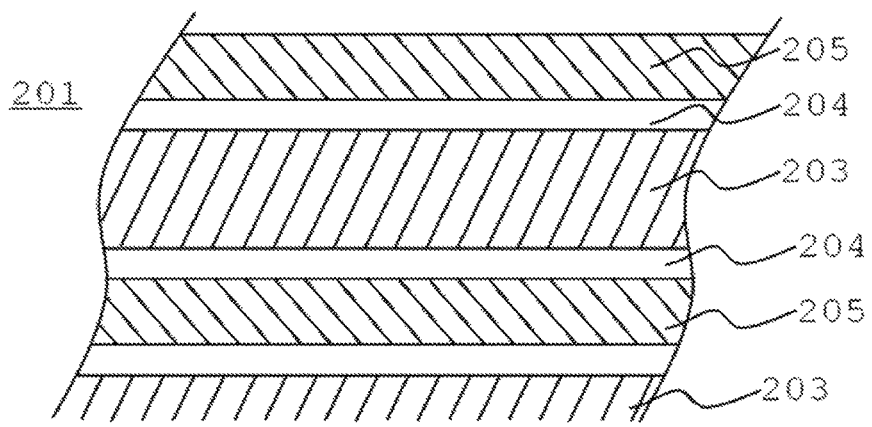
FIG. 5 is an enlarged view of the nonaqueous electrolyte secondary battery according to the third embodiment.

A flat wound electrode group 201 is housed in the saclike exterior material 202 including the laminated film having aluminum foil interposed between two resin layers. As illustrated in a partially extracted schematic view in FIG. 5, the flat wound electrode group 201 includes the negative electrode 203, the separator 204, the positive electrode 205, and the separator 204, disposed in sequence. The disposed materials are spirally wound and the spiral disposed materials are subjected to press forming. As a result, the flat wound electrode group 201 is formed. An electrode nearest to the saclike exterior material 202 is the negative electrode 203. The negative electrode 203 includes no negative electrode mixture formed on a negative electrode collector on the side of the exterior material 202. The negative electrode 203 has a configuration in which the negative electrode mixture is formed only on one side of the negative electrode collector on the side of a battery inner surface. Other negative electrodes 203 include the negative electrode mixture formed on both sides of the negative electrode collector. The positive electrode 205 includes a positive electrode mixture formed on both sides of a positive electrode collector.

In proximity to an outer circumferential end of the wound electrode group 201, a negative electrode terminal 206 is electrically coupled to the negative electrode collector of the outermost negative electrode 203 and a positive electrode terminal 207 is electrically coupled to the positive electrode collector of the positive electrode 205 inside. These negative electrode terminal 206 and positive electrode terminal 207 protrude from an opening of the exterior material 202 to the outside. For example, the liquid nonaqueous electrolyte is injected from the opening of the exterior material 202. Heat sealing is performed to the opening of the saclike exterior material 202 with the negative electrode terminal 206 and the positive electrode terminal 207 interposed. Thus, the wound electrode group 201 and the liquid nonaqueous electrolyte are sealed.

Examples of the negative electrode terminal 206 include aluminum and an aluminum alloy including, for example, an element of Mg, Ti, Zn, Mn, Fe, Cu, or Si. The negative electrode terminal 206 is preferably a material the same as that of the negative electrode collector in order to reduce contact resistance with the negative electrode collector.

A material having electrical stability and conductivity in a range in which potential with respect to lithium ion metal is between 3 and 4.25 V, can be used for the positive electrode terminal 207. The specific examples include aluminum and an aluminum alloy including, for example, an element of Mg, Ti, Zn, Mn, Fe, Cu, or Si. The positive electrode terminal 207 is preferably a material the same as that of the positive electrode collector in order to reduce contact resistance with the positive electrode collector.

The exterior material 202, the positive electrode 205, the electrolyte, and the separator 204 that are constituent members of the nonaqueous electrolyte secondary battery 200, will be described in detail below.

1) Exterior Material 202

The exterior material 202 is formed of the laminated film with a thickness of 0.5 mm or less. Alternatively, a metal-made container with a thickness of 1.0 mm or less is used for the exterior material 202. The thickness of the metal-made container is more preferably 0.5 mm or less.

The shape of the exterior material 202 can be selected from a flat type (thin type), a rectangular type, a cylindrical type, a coin type, or a button type. Examples of the exterior material 202 include an exterior material for a small-sized battery to be set in portable electronic devices, and an exterior material for a large-sized battery to be set in two-wheeled or four-wheeled vehicles, in response to battery size.

A multilayer film including a metal layer interposed between resin layers, is used for the laminated film. The metal layer is preferably aluminum foil or aluminum alloy foil for weight reduction. Examples of the resin layers that can be used include high polymer materials, such as polypropylene (PP), polyethylene (PE), nylon, and polyethylene terephthalate (PET). Sealing is performed to the laminated film by heat sealing. Thus, the laminated film can be formed so as to have the shape of the exterior material 202.

The metal-made container is formed of, for example, aluminum or an aluminum alloy. The aluminum alloy is preferably an alloy including, for example, an element of magnesium, zinc, or silicon. In a case where the alloy includes a transition metal, such as copper, nickel, or chromium, the amount of the transition metal is preferably made to be 100 mass ppm or less.

2) Positive Electrode 205

The positive electrode 205 has a structure in which the positive electrode mixture is supported on one side or both sides of the positive electrode collector, the positive electrode mixture including the active material.

The thickness of the positive electrode mixture on the one side is preferable in a range of 1.0 µm or more to 150 µm or less in terms of retention of the large-current discharge characteristics and the cycle lifetime. Therefore, in a case where being supported on both sides of the positive electrode collector, the total thickness of the positive electrode mixture is preferably in a range of 20 µm or more to 300 µm or less. The more preferable range of the thickness on the one side is 30 µm or more to 120 µm or less. The large-current discharge characteristics and the cycle lifetime improve in the range.

The positive electrode mixture may include a conductive material other than a binder that binds a positive electrode active material and another positive electrode active material.

Various types of oxides, such as manganese dioxide, lithium-manganese compound oxide, lithium-containing nickel-cobalt oxide (for example, $LiCOO_2$, $LiNi_{0.8}CO_{0.2}O_2$), and lithium-manganese compound oxide (for example, $LiMn_2O_4$, $LiMnO_2$), are preferably used for the positive electrode active material in order to obtain a high voltage.

Examples of the conductive material include acetylene black, carbon black, and graphite.

Specific examples of the binder that can be used include polytetrafluoroethylene (PTFE), polyvinylidene fluoride (PVdF), ethylene-propylene-diene copolymer (EPDM), and styrene-butadiene rubber (SBR).

The compounding ratios of the positive electrode active material, the conductive material, and the binder, are preferably in a range of 80 mass % or more to 95 mass % or less, in a range of 3 mass % or more to 20 mass % or less, and in a range of 2 mass % or more to 7 mass % or less, respectively, in order to obtain the favorable large-current discharge characteristics and cycle lifetime.

A conductive substrate having a porous structure or a nonporous and conductive substrate can be used for the collector. The thickness of the collector is preferably 5 µm or more to 20 µm or less. A balance between electrode strength and weight reduction can be made in this range.

For example, the active material, the conductive material, and the binder are suspended in a general-purpose solvent to prepare slurry. Then, the slurry is coated on the collector, and then is dehydrated. After that, a press is performed so that the positive electrode 205 is manufactured. The active material, the conductive material, and the binder are formed so as to be pellet-shaped as a positive electrode layer. The positive electrode 205 may be manufactured by forming the positive electrode layer on the collector.

3) Negative Electrode 203

The negative electrode 100 described in the second embodiment is used for the negative electrode 203.

4) Electrolyte

Examples of the electrolyte that can be used include a nonaqueous electrolytic solution, an electrolyte impregnation-typed polymer electrolyte, a high polymer electrolyte, and an inorganic solid electrolyte.

The nonaqueous electrolytic solution is a liquid electrolytic solution prepared by dissolving the electrolyte into a nonaqueous solvent. The nonaqueous electrolytic solution is retained in a space in the electrode group.

A nonaqueous solvent having, as a main body, a mixed solvent including propylene carbonate (PC), or ethylene carbonate (EC), and a nonaqueous solvent with viscosity lower than that of each of the PC and the EC (hereinafter, referred to as a second solvent), is preferably used for the nonaqueous solvent.

For example, chain carbon is preferable for the second solvent. Specific examples of the second solvent include dimethyl carbonate (DMC), methyl ethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). These second solvents can be individually used or can be used in a form of a mixture including at least two types. In particular, the second solvent preferably has a donner number of 16.5 or less.

The viscosity of the second solvent is preferable 2.8 cmp or less at 25° C. A compounding amount of ethylene carbonate or propylene carbonate in the mixed solvent is preferably between 1.0 and 80% in volume ratio. A more preferable compounding amount of ethylene carbonate or propylene carbonate is between 20 and 75% in volume ratio.

Examples of the electrolyte included in the nonaqueous electrolyte, include lithium salt (electrolyte), such as lithium perchlorate ($LiClO_4$), lithium phosphate hexafluoride ($LiPF_6$), lithium borofluoride ($LiBF_4$), lithium arsenic hexafluoride ($LiAsF_6$), lithium trifluoromethanesulfonate ($LiCF_3SO_3$), and bistrifluoromethyl sulfonylimide lithium [$LiN(CF_3SO_2)_2$]. In particular, $LiPF_6$ or $LiBF_4$ is preferably used.

An amount of dissolution of the electrolyte with respect to the nonaqueous solvent is preferably made to be 0.5 µm or more to 2.0 mol/L or less.

5) Separator 204

In a case where the nonaqueous electrolyte is used and in a case where the electrolyte impregnation-typed polymer electrolyte is used, the separator 204 can be used. A porous separator is used for the separator 204. Examples of a material of the separator 204 that can be used include a porous film and a synthetic-resin-made nonwoven fabric that include polyethylene, polypropylene, or polyvinylidene fluoride (PVdF). In particular, the porous film including polyethylene, polypropylene, or both thereof, is preferable because safety of the secondary battery can improve.

The thickness of the separator 204 is preferably made to be 30 µm or less. When the thickness exceeds 30 µm, a distance between the positive electrode and the negative electrode increases. Thus, there is a risk that internal resistance increases. The lower limit of the thickness is preferably made to be 5 µm. When the thickness is made to be less than 5 µm, strength of the separator 204 considerably degrades. Thus, there is a risk that an internal short circuit easily occurs. The upper limit of the thickness is more preferably made to be 25 µm. The lower limit is more preferably made to be 1.0 µm.

The separator 204 preferably has a thermal shrinkage factor of 20% or less when having been let stand at 120° C. for an hour. When the thermal shrinkage factor exceeds 20%, a possibility that a short circuit occurs due to heating, increases. The thermal shrinkage factor is preferably made to be 15% or less.

The porosity of the separator 204 is preferably in a range of 30% or more to 60% or less. This is because of the following reason. When the porosity is made to be less than 30%, there is a risk that the separator 204 has difficulty in acquiring high electrolyte retentivity. Meanwhile, when the porosity exceeds 60%, there is a risk that the sufficient strength of the separator 204 may not be achieved. A more preferable range of the porosity is 35% or more to 70% or less.

The separator 204 preferably has an air transmissivity of 500 sec/100 $cm^3$ or less. When the air transmissivity exceeds 500 sec/100 $cm^3$, there is a risk that the separator 204 has difficulty in acquiring high lithium ion mobility. The lower limit of the air transmissivity is 30 sec/100 $cm^3$. This is because there is a risk that the sufficient strength of the separator 204 may not be achieved when the air transmissivity is made to be less than 30 sec/100 $cm^3$.

The upper limit of the air transmissivity is more preferably made to be 300 sec/100 $cm^3$. The lower limit of the air transmissivity is more preferably made to be 50 sec/100 $cm^3$.

A surface of the separator 204 may be coated with ceramic particles. Accordingly, the safety can improve. Examples of the ceramic particles include $Al_2O_3$, $TiO_2$, and $ZrO_2$.

Fourth Embodiment

Next, a battery pack according to a fourth embodiment will be described.

The battery pack according to the fourth embodiment includes at least one nonaqueous electrolyte secondary battery according to the third embodiment described above (namely, electric cell). In a case where the battery pack includes a plurality of electric cells, the respective electric cells are electrically coupled in series, in parallel, or in series and in parallel so as to be disposed.

The battery pack 300 will be specifically described with reference to a schematic view in FIG. 6 and a block diagram in FIG. 7. The battery pack 300 illustrated in FIG. 6 uses the nonaqueous electrolyte secondary battery 200 illustrated in FIG. 4 as the electric cell 301.

A plurality of electric cells 301 is disposed so that negative electrode terminals 302 and positive electrode terminals 303 protruding to the outside are arranged in the same direction. The plurality of electric cells 301 is fastened with an adhesive tape 304 so that an assembled battery 305 is formed. These electric cells 301 are electrically coupled to each other in series as illustrated in FIG. 7.

A printed circuit board 306 is disposed so as to face a side surface of the electric cells 301 from which the negative electrode terminals 302 and the positive electrode terminals 303 protrude. The printed circuit board 306 includes a thermistor 307, a protective circuit 308, and a current-carrying terminal 309 to an external device, mounted thereon as illustrated in FIG. 7. Note that, a surface of the printed circuit board 306 facing the assembled battery 305, includes an insulating plate (not illustrated) attached thereon in order to avoid unnecessary connection with a conductive line of the assembled battery 305.

A positive-electrode-side lead 310 is coupled to the positive electrode terminal 303 positioned at the lowest layer of the assembled battery 305. A leading end of the positive electrode terminal 303 is inserted into a positive-electrode-side connector 311 of the printed circuit board 306 so as to be electrically coupled. A negative-electrode-side lead 312 is coupled to the negative electrode terminal 302 positioned at the highest layer of the assembled battery 305. A leading end of the negative electrode terminal 302 is inserted into a negative-electrode-side connector 313 of the printed circuit board 306 so as to be electrically coupled. These connectors 311 and 313 are coupled to the protective circuit 308 through traces 314 and 315 formed on the printed circuit board 306.

The thermistor 307 is used in order to detect the temperature of the assembled battery 305. A detected signal is transmitted to the protective circuit 308. The protective circuit 308 can disconnect a plus-side trace 316a and a minus-side trace 316b between the protective circuit 308 and the current-carrying terminal 309 to the external device in predetermined conditions. The predetermined conditions include, for example, a case where the temperature detected by the thermistor 307 becomes a predetermined temperature or more. The predetermined conditions also include a case where, for example, an overcharge, an overdischarge, or an excess current of the electric cells 301 is detected. The detection of the overcharge or the like is performed to each of the electric cells 301 or the entire electric cells 301. In a case where each of the electric cells 301 is detected, a battery voltage may be detected. Alternatively, positive electrode potential or negative electrode potential may be detected. In the latter case, a lithium electrode to be used as a reference electrode is inserted into each of the electric cells 301. In cases of FIGS. 6 and 7, conductive lines 317 for the voltage detection are coupled to the respective electric cells 301. A detection signal is transmitted to the protective circuit 308 through each of the conductive lines 317.

Protective sheets 318 including rubber or resin are individually disposed on three lateral surfaces of the assembled battery 305 except the side surface from which the positive electrode terminals 303 and the negative electrode terminals 302 protrude.

The assembled battery 305 is housed in a housing container 319 together with the respective protective sheets 318 and the printed circuit board 306. That is, the respective protective sheets 318 are individually disposed on both inner side surfaces of the housing container 319 in a longitudinal direction and on an inner side surface of the housing container 319 in a lateral direction. The printed circuit board 306 is disposed on another inner side surface on the side opposite to the inner side surface in the lateral direction. The assembled battery 305 is positioned in a space surrounded by the protective sheets 318 and the printed circuit board 306. A lid 320 is attached to an upper surface of the housing container 319.

Note that, a heat-shrinkable tape may be used for fixing the assembled battery 305, instead of the adhesive tape 304. In this case, the protective sheets 318 are disposed on both of the inner side surfaces of the assembled battery 305 and then the heat-shrinkable tape is wound therearound. After that, the heat-shrinkable tape is subjected to thermal contraction so that the assembled battery 305 is bound.

Figure 6:
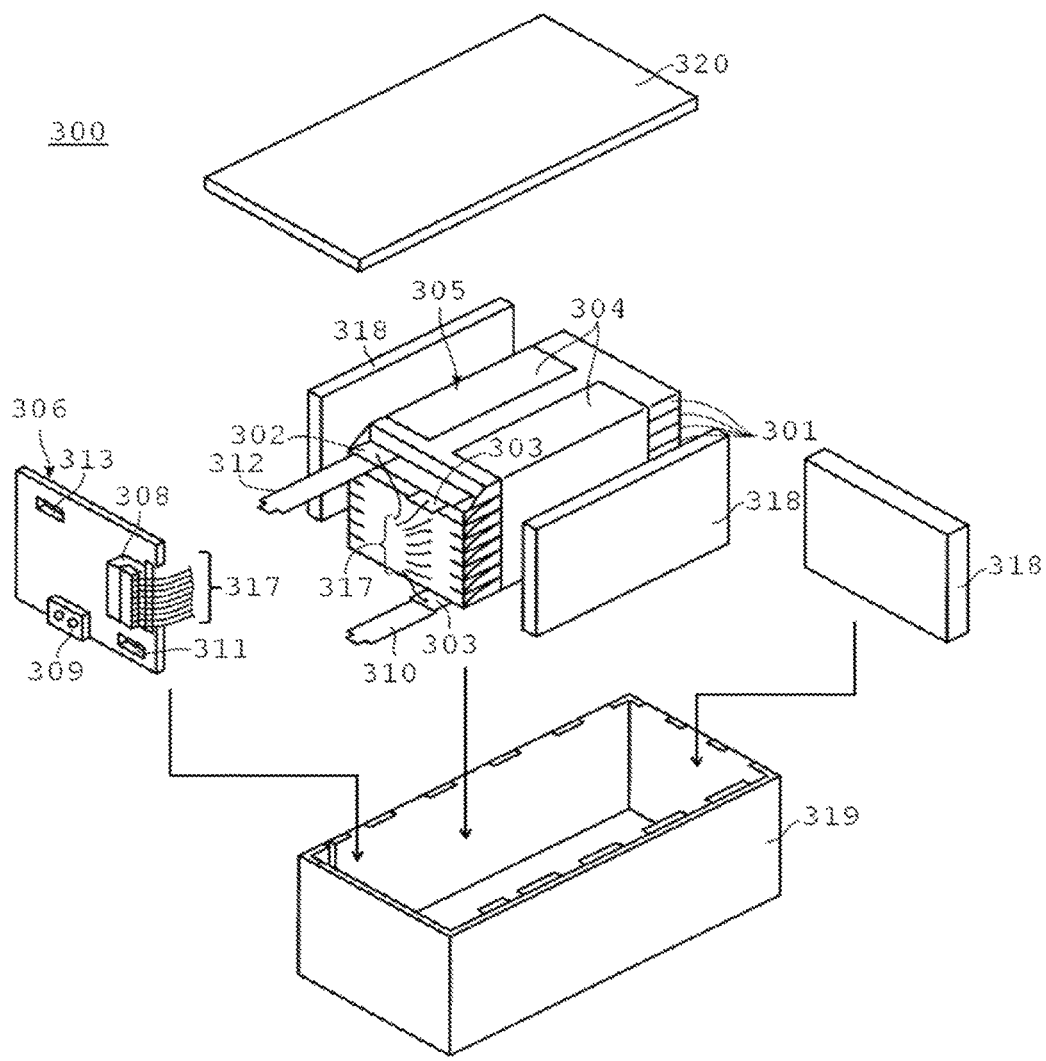
FIG. 6 is a schematic view of a battery pack according to a fourth embodiment.
Figure 7:
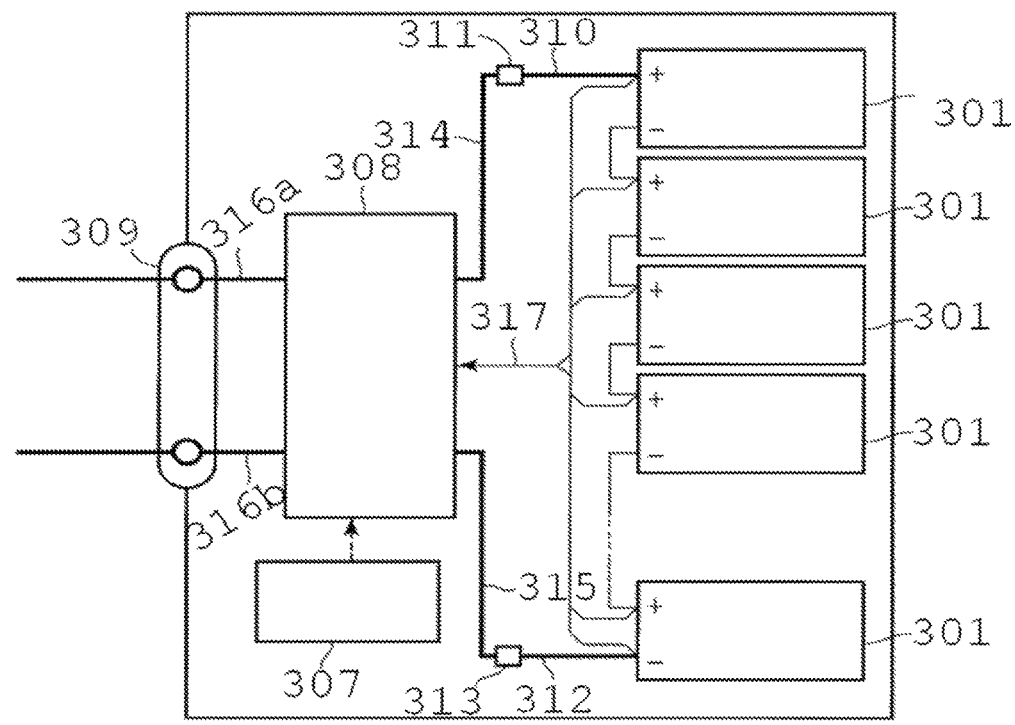
FIG. 7 is a block diagram of an electric circuit of the battery pack.

A form in which the electric cells 301 are coupled in series, has been given in FIGS. 6 and 7. The electric cells 301 may be coupled in parallel in order to increase battery capacity. Alternatively, a combination of serial connection and parallel connection may be used. The assembled battery packs can be further coupled in series or in parallel.

According to the present embodiment described above, the battery pack having an excellent charge and discharge cycle function can be provided by including the nonaqueous electrolyte secondary battery having the excellent charge and discharge cycle function according to the third embodiment.

Note that, a form of the battery pack is appropriately varied depending on a use. The use of the battery pack is preferable in a case where excellent cycle characteristics are given when large current is extracted. Specifically, examples of the use of the battery pack include a power supply of a digital camera and vehicles, such as a two-wheeled or four-wheeled hybrid electric vehicle, a two-wheeled or four-wheeled electric vehicle, and an electric assisted bicycle. In particular, the battery pack with the nonaqueous electrolyte secondary battery having excellent high-temperature characteristics, is preferably used for the vehicles.

Fifth Embodiment

Figure 8:
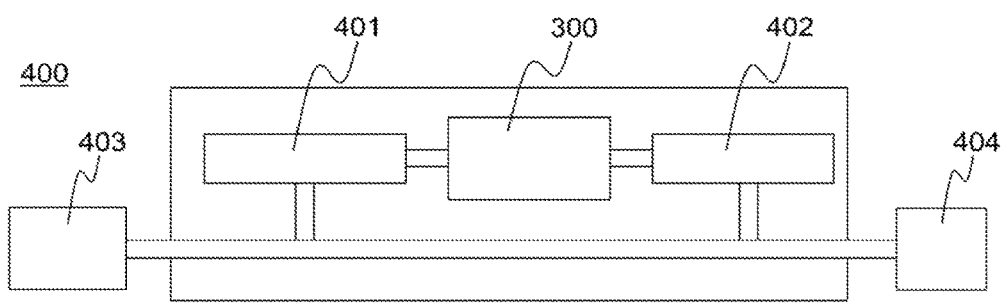
FIG. 8 is a schematic view of a power storage device according to a fifth embodiment.

A power storage device 400 can be equipped with the battery pack 300 according to the fourth embodiment. The power storage device 400 illustrated in a schematic view of FIG. 8 includes the battery pack 300, an inverter 402, and a converter 401. The converter 401 performs DC conversion to an external AC power supply 403 so that the battery pack 300 is charged. Then, the inverter 402 having a DC power supply from the battery pack 300, performs AC conversion so that electricity is supplied to a load 404. The power storage device 400 includes the present configuration with the battery pack 300 according to the embodiment. Thus, the power storage device 400 having excellent battery characteristics is provided.

Sixth Embodiment

Figure 9:
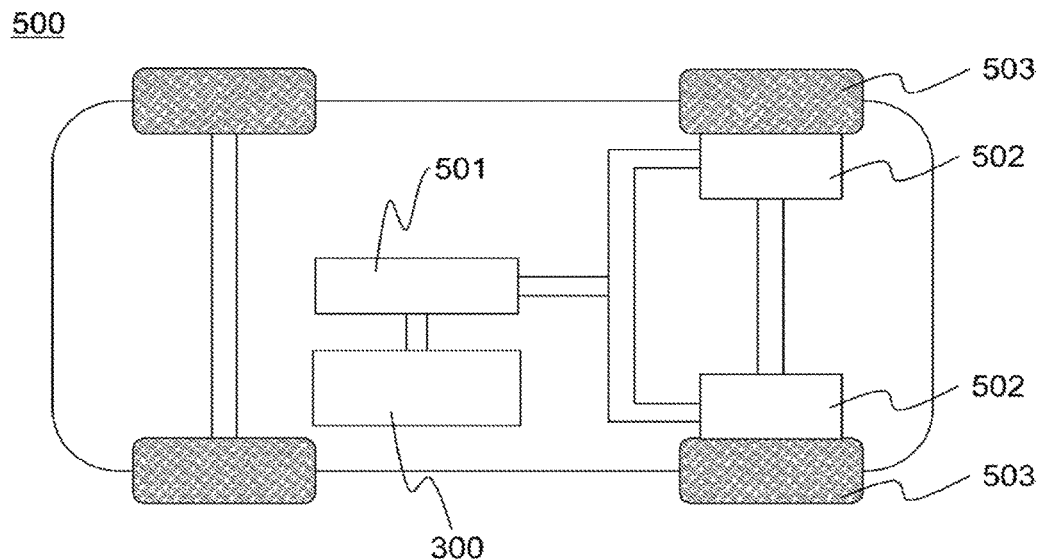
FIG. 9 is a schematic view of a vehicle according to a sixth embodiment.
Figure 10:
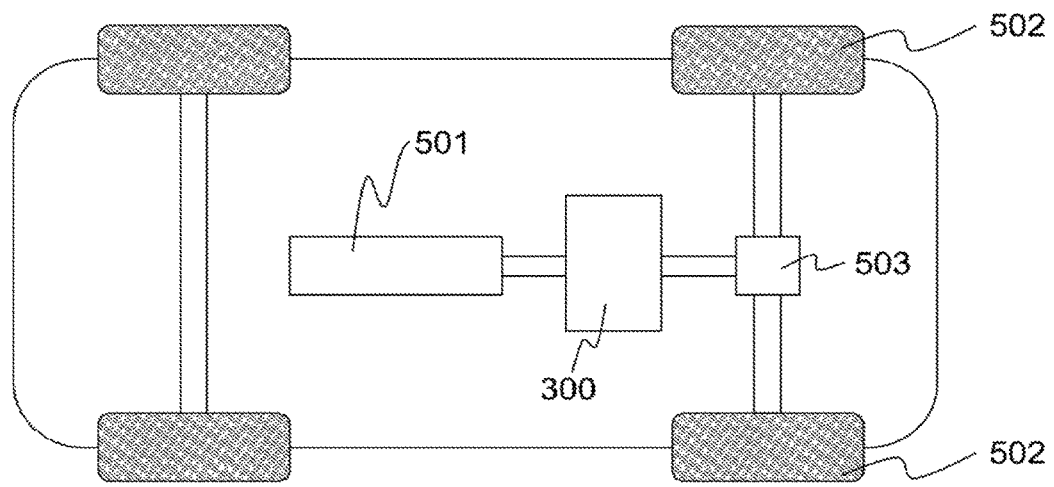
FIG. 10 is a schematic view of another vehicle according to the sixth embodiment.

A vehicle 500 can be equipped with the battery pack 300 according to the fourth embodiment. The vehicle 500 illustrated in a schematic view of FIG. 9 includes at least the battery pack 300, an inverter 501, a motor 502, and wheels 503. The inverter 501 performs AC conversion to a DC power supply from the battery pack 300. Then, the AC power supply drives the motor 502. In a case where a motor driven by direct current is used, the inverter 501 is omitted. In the figure, for example, a charging mechanism of the battery pack 300 is omitted. Driving force of the motor 502 can rotate the wheels 503. Note that, examples of the vehicle 500 include an electric motor vehicle, such as an electric train, and a hybrid vehicle having another driving source, such as an engine. The battery pack 300 may be charged by regenerative energy from the motor 502. Driving by electrical energy from the battery pack 300 is not limited to the motor 502. As illustrated in a schematic view of FIG. 10, the driving may be used for a power source for operating an electrical device 501 of a vehicle 500. In a case of the vehicle 500 illustrated in the schematic view of FIG. 10, for example, a dynamo 503, such as a motor, fitted to an axle portion of a pair of wheels 502, operates upon deceleration of the vehicle 500 so that regenerative energy is obtained. Then, the battery pack 300 is preferably charged by using the obtained regenerative energy.

EXAMPLES

Specific examples will be given and effects thereof will be described below. Note that these embodiments are not limited to the examples.

Example 1

An active material complexed particle is manufactured in the following conditions.

A commercially available silicon monoxide particle (an average grain diameter of 45 µm) was pulverized by a ball mill. Powder having an average grain diameter of 0.3 µm was obtained.

Magnesium nitrate hexahydrate in an amount of 6 g was dissolved into a mixed solution including water and ethanol, of 20 cc so that an aqueous solution was made. Sucrose ($C_{12}H_{22}O_{11}$) in an amount of 0.06 g and the pulverized silicon monoxide powder in an amount of 4 g were added to the aqueous solution and then one-hour mixing was performed by a magnet stirrer. The mixed solution was dehydrated by using an evaporator. Furthermore, dehydration in a vacuum was performed at 100° C. After that, the obtained powder was collected and put into an electric furnace. Then, the powder was heated at 150° C. under a flow of Ar gas. As a result, a silicon monoxide particle including a surface thereof covered with an oxide precursor and a carbon precursor, was manufactured. Next, the silicon monoxide particle covered with the oxide precursor and the carbon precursor was sequentially subjected to heat treatment at 700° C. in an argon gas atmosphere for one hour. Accordingly, the silicon monoxide particle covered with an oxide and a carbonaceous substance (including a silicate compound) was obtained.

The silicon monoxide particle covered with the oxide and the carbonaceous substance was complexed with hard carbon by the following process. The covered silicon monoxide particle in an amount of 4 g and graphite powder in an amount of 0.3 g were added to a mixed solution including furfuryl alcohol in an amount of 5 g and ethanol in an amount of 10 g. Then, mixing was performed by a planetary ball mill. As a result, slurry was manufactured. The obtained slurry was filtered so that the balls were removed. Dilute hydrochloric acid to be a polymerizing catalyst for furfuryl alcohol, in an amount of 0.5 g was added to the filtered slurry. Then, the filtered slurry with dilute hydrochloric acid was left, dehydrated, and solidified at room temperature. As a result, a carbon complexed precursor was obtained. The obtained carbon complexed precursor was input into an electric furnace and then was calcined at 1000° C. in an Ar gas atmosphere for two hours. After that, the calcined carbon complexed precursor was cooled until room temperature and was pulverized by using a mortar. Then, negative electrode active material complexed powder was obtained by using a sieve having an opening of 20 μm.

Graphite powder with an average grain diameter of 3 μm, in an amount of 0.1 g was mixed with the obtained negative electrode active material complexed powder in an amount of 0.6 g. Then, the mixture was mixed in a solution prepared with an N-methylpyrrolidone dispersion medium so that polyimide was made to be 16 mass %, and the mixing was performed with a mixer. The obtained pasty slurry was coated on copper foil with a thickness of 12 μm. Then, the slurry on the copper foil was subjected to pressing. After that, the pressed flurry on the copper foil was subjected to heat treatment at 400° C. in Ar gas for two hours.

(Charge and Discharge Test)

The copper foil with an electrode was cut into a size of 20×20 mm. After that, the cut copper foil was dehydrated at 100° C. in a vacuum for 12 hours so as to be a test electrode. A battery including a counter electrode and a reference electrode having a metal of Li and an electrolytic solution having an EC.DEC (volume ratio: EC:DEC=1:2) mixed solution with an electrolyte of $LiN(CF_3SO_2)_2$, was manufactured. Then, a charge and discharge test was performed with the battery. All the assembly of the battery was performed in a glove box including an Ar atmosphere filled therein.

In conditions of the charge and discharge test, charge was performed with a constant current of 1 mA until a potential difference of 0.01 V between the reference electrode and the test electrode and then charge was performed with a constant voltage (CC/CV charge). Discharge was performed with a constant current of 1 mA until 1.5 V (CC discharge). The rate of discharge capacity to initial charge capacity at this time was defined as initial charge and discharge efficiency.

Furthermore, after that, a cycle including charge to be performed with a constant current of 6 mA until a potential difference of 0.01 V between the reference electrode and the test electrode, charge to be performed with a constant voltage, and discharge to be performed with a constant current of 6 mA until 1.5 V, was repeated 30 times. The ratio of thirtieth discharge capacity to first discharge capacity during the charge and discharge with a constant current of 6 mA, was defined as a discharge capacity retention factor.

Results of examples and comparative examples are collectively illustrated in Table 1. Only sections in examples and comparative examples below different from those in Example 1 will be described. Since other synthesization and evaluation processes were performed similarly to Example 1, the descriptions thereof will be omitted.

Example 2

Example 2 is different from Example 1 in that the temperature of heat treatment for carbon complexing was 1100° C. A target object was manufactured by a method the same as that according to Example 1. Then, the target object was made to be an electrode. A charge and discharge test was performed to the electrode by a method the same as that according to Example 1.

Example 3

Example 3 is different from Example 1 in that aluminum nitrate nonahydrate in an amount of 14 g was used instead of magnesium nitrate salt. A target object was manufactured by a method the same as that according to Example 1. The target object was made so as to be an electrode. A charge and discharge test was performed to the electrode by a method the same as that according to Example 1.

Example 4

Example 4 is different from Example 1 in that iron nitrate nonahydrate in an amount of 8 g was used instead of magnesium nitrate salt. A target object was manufactured by a method the same as that according to Example 1. The target object was made so as to be an electrode. A charge and discharge test was performed to the electrode by a method the same as that according to Example 1.

Example 5

Example 5 is different from Example 1 in that zirconium oxynitrate dihydrate in an amount of 4 g was used instead of magnesium nitrate salt. A target object was manufactured by a method the same as that according to Example 1. The target object was made so as to be an electrode. A charge and discharge test was performed to the electrode by a method the same as that according to Example 1.

Example 6

Magnesium oxide and a carbon material were covered with silicon powder having an average grain diameter of 40 nm instead of silicon monoxide powder, by a method the same as that according to Example 1. The covering silicon particles in an amount of 1 g, furfuryl alcohol in an amount of 3.2 g, and ethanol in an amount of 10 g were mixed so as to be slurry. Then, the slurry was subjected to complexing treatment so as to be a negative electrode active material, similarly to Example 1. The active material was used to make an electrode by a method the same as that according to Example 1. A charge and discharge test was performed by a method the same as that according to Example 1.

Comparative Example 1

Comparative Example 1 is different from Example 1 in that a silicon monoxide particle pulverized similarly to Example 1 was directly subjected to complexing treatment with a carbonaceous substance without being subjected to covering treatment with an oxide and a carbonaceous substance. A target object was manufactured and the target object was made to be an electrode by the method described in Example 1. A charge and discharge test was performed to the electrode by a method the same as that according to Example 1.

Comparative Example 2

Comparative Example 2 is different from Example 6 in that magnesium oxide covering was not performed. A target object was manufactured and the target object was made to be an electrode by a method the same as that according to Example 6. A charge and discharge test was performed.

TABLE 1

| | FORMED SILICATE PHASE | INITIAL CHARGE AND DISCHARGE CAPACITY (mAh/g) | INITIAL CHARGE AND DISCHARGE EFFICIENCY (%) | DISCHARGE CAPACITY RETENTION FACTOR (%) |
|---|---|---|---|---|
| EXAMPLE 1 | $MgSiO_3$, $Mg_2SiO_4$ | 1132 | 65.3 | 99.4 |
| EXAMPLE 2 | $MgSiO_3$, $Mg_2SiO_4$ | 1045 | 63.8 | 99.5 |
| EXAMPLE 3 | $Al_2SiO_5$ | 1105 | 64.8 | 99.5 |
| EXAMPLE 4 | $FeSiO_3$, $Fe_2SiO_4$ | 1103 | 65.3 | 99.4 |
| EXAMPLE 5 | $ZrSiO_4$ | 1097 | 64.9 | 98.4 |
| EXAMPLE 6 | $MgSiO_3$, $Mg_2SiO_4$ | 1788 | 80.5 | 91.3 |
| COMPARATIVE EXAMPLE 1 | — | 1130 | 61.0 | 95.0 |
| COMPARATIVE EXAMPLE 2 | — | 1850 | 75.0 | 83.2 |

As a result of each electrode layer obtained in Examples 1 to 6, in X-ray diffraction measurement and in measurement and analysis with TEM-EDX, a phase including a silicate compound phase described in Table 1 was detected other than silicon having a diffraction peak representative at $2\theta=28.4°$ In addition, a phase including an oxide that was used for covering and remained with no reaction, was partially observed. As described above, it was found that forming a silicate compound reduced a silicate oxide phase to be a cause of irreversible capacity and initial charge and discharge efficiency improved. A silicate compound phase to be formed anew was an inert phase to lithium, and had electronic conductivity due to a conductive assistant. Thus, the silicate compound phase had an excellent cycle lifetime.

According to Example 2 in which the temperature of the complexing heat treatment was 1100° C., it was found that a part of silicon particles partially became silicon carbide. Part of silicon became silicon carbide due to disproportionation. As a result, capacity slightly decreased. However, initial charge and discharge efficiency was hardly influenced and a lifetime improved.

In a case where the silicon particle was used instead of the silicon oxide, it was found that an effect the same as that with the silicon oxide was obtained. As described above, the phase including the silicate compound and the conductive assistant, formed by the reaction around the silicon oxide including silicon was provided. Furthermore, the circumference of the phase was covered with and complexed with the carbonaceous substance. Therefore, it was found that the initial charge and discharge efficiency improved, the conductive path was retained upon the cycle, and the cycle lifetime improved.

In the present specification, some of the elements are denoted with only atomic symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material for a nonaqueous electrolyte battery, comprising:
    a particle of silicon oxide enveloping particles of silicon;
    a carbonaceous substance covering the particle of silicon oxide enveloping particles of silicon; and
    a phase comprising a silicate compound mixed with a conductive assistant, the phase being interposed between the particle of silicon oxide enveloping particles of silicon and the carbonaceous substance,
    wherein
    the silicate compound is at least one compound selected from the group consisting of $MgSiO_3$, $Mg_2SiO_4$, $TiSiO_4$, $Mn_2SiO_4$, $FeSiO_3$, $Fe_2SiO_4$, $Co_2SiO_4$, $Ni_2SiO_4$, $Al_2SiO_5$, $ZrSiO_4$, $Y_2SiO_5$, and $Y_2Si_2O_7$.

2. The active material according to claim 1,
    wherein the particle of silicon oxide enveloping the particles of silicon account for from 20 mass % or more to 75 mass % or less when mass of the active material is defined as 100 mass %.

3. The active material according to claim 1,
    wherein the conductive assistant includes at least one material selected from the group consisting of graphite, hard carbon, soft carbon, amorphous carbon, acetylene black, and silicon carbide.

4. The active material according to claim 1,
    wherein a mass mixing ratio between the silicate compound and the conductive assistant is between 10:90 and 90:10.

5. The negative electrode active material according to claim 1, wherein an average primary grain diameter of the active material is from 0.1 μm to 50 μm.

6. A negative electrode for a nonaqueous electrolyte secondary battery, comprising:
   a collector; and
   an electrode mixture layer on the collector, comprising the negative electrode active material according to claim 1, and further comprising a conductive material and a binder.

7. The negative electrode according to claim 6 wherein the conductive material is selected from the group consisting of acetylene black, carbon black and graphite.

8. A nonaqueous electrolyte secondary battery comprising:
   an exterior material;
   a positive electrode housed in the exterior material;
   a negative electrode spatially apart from the positive electrode, the negative electrode being housed in the exterior material with a separator interposed between the negative electrode and the positive electrode, the negative electrode comprising the negative electrode according to claim 6; and
   a nonaqueous electrolyte filled in the exterior material.

9. A battery pack comprising the nonaqueous electrolyte secondary battery according to claim 8.

10. A vehicle comprising the battery pack according to claim 9.

* * * * *